US010255876B2

(12) United States Patent
Chang et al.

(10) Patent No.: US 10,255,876 B2
(45) Date of Patent: Apr. 9, 2019

(54) SYSTEM AND METHOD FOR DISPLAY AUTO-CORRECTION IMPEDANCE MISMATCH CONTROL

(71) Applicant: Dell Products, LP, Round Rock, TX (US)

(72) Inventors: Ching-Wei Chang, New Taipei (TW); I-Yu Chen, Taipei (TW)

(73) Assignee: Dell Products, LP, Round Rock, TX (US)

( * ) Notice: Subject to any disclaimer, the term of this patent is extended or adjusted under 35 U.S.C. 154(b) by 10 days.

(21) Appl. No.: 15/362,593

(22) Filed: Nov. 28, 2016

(65) Prior Publication Data

US 2018/0151151 A1    May 31, 2018

(51) Int. Cl.
| | |
|---|---|
| *G06F 3/045* | (2006.01) |
| *G09G 5/00* | (2006.01) |
| *G06T 1/20* | (2006.01) |
| *H04L 25/02* | (2006.01) |

(52) U.S. Cl.
CPC .............. *G09G 5/006* (2013.01); *G06T 1/20* (2013.01); *G09G 2330/08* (2013.01); *G09G 2330/12* (2013.01); *H04L 25/02* (2013.01)

(58) Field of Classification Search
CPC ... H03H 7/38; H04L 25/0278; G06F 13/1694; G06F 13/4086; H05K 1/025
See application file for complete search history.

(56) References Cited

U.S. PATENT DOCUMENTS

| | | | |
|---|---|---|---|
| 4,647,871 A | 3/1987 | Turner | |
| 4,704,573 A | 11/1987 | Turner | |
| 7,098,826 B2 | 8/2006 | Madireddy | |
| 7,714,665 B2 | 5/2010 | Waheed | |
| 8,803,535 B2 | 8/2014 | Kothandaraman | |
| 9,819,991 B1* | 11/2017 | Rajagopalan | .... H04N 21/42607 |
| 2005/0184922 A1* | 8/2005 | Ida | .......... H01Q 23/00 |
| | | | 343/861 |
| 2005/0270196 A1 | 12/2005 | Madireddy | |
| 2007/0188244 A1 | 8/2007 | Waheed | |
| 2008/0123771 A1 | 5/2008 | Cranford | |

(Continued)

FOREIGN PATENT DOCUMENTS

| | | |
|---|---|---|
| WO | 87/03378 | 6/1987 |
| WO | 2009/145763 | 12/2009 |

*Primary Examiner* — Hau H Nguyen
(74) *Attorney, Agent, or Firm* — Prol Intellectual Property Law, PLLC; H. Kenneth Prol

(57) ABSTRACT

A method and information handling system including a display device connector for connecting to a digital display device, a controller executing instructions of an impedance mismatch control system for determining impedance differences along an operative connection from the display device connector to the digital display device, where the controller receives a display device connector impedance measurement and a second impedance measurement from a point further along the operative connection between the display device connector and the digital display device, and the controller executes the impedance mismatch control system to determine an impedance mismatch exists from the impedance difference between the display device connector and the point further along the operative connection between the display device connector and the digital display device.

20 Claims, 6 Drawing Sheets

(56) References Cited

U.S. PATENT DOCUMENTS

2008/0144808 A1   6/2008  Goodrich
2013/0002267 A1   1/2013  Kothandaraman
2016/0112028 A1*  4/2016  Beier .................... H01L 23/495
                                                                343/861

* cited by examiner

SYSTEM AND METHOD FOR DISPLAY AUTO-CORRECTION IMPEDANCE MISMATCH CONTROL

FIELD OF THE DISCLOSURE

The present disclosure generally relates to information handling systems, and more particularly relates to management of impedance mismatch for display devices used with information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include various types of memory such as random access memory (RAM), ROM, flash memory of a variety of types and/or other types of nonvolatile memory. Information handling system may also include one or more processing resources such as a central processing unit (CPU) or hardware or software control logic, various controllers and the like. Additional components of the information handling system may include one or more disk drives, one or more network ports for communicating with external devices as well as various input and output (I/O) devices, such as a keyboard, a mouse, touch screen and/or a video display. Controllers and drivers may also assist in operation of any of the additional components. In an aspect, one or more display devices which may be LED, OLED, LCD or other display types may be connected to an information handling system as understood in the art. The information handling system may also include one or more buses operable to transmit communications between the various hardware components such as a central processing unit, a graphics processing unit, and one or more graphics controller subsystems.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
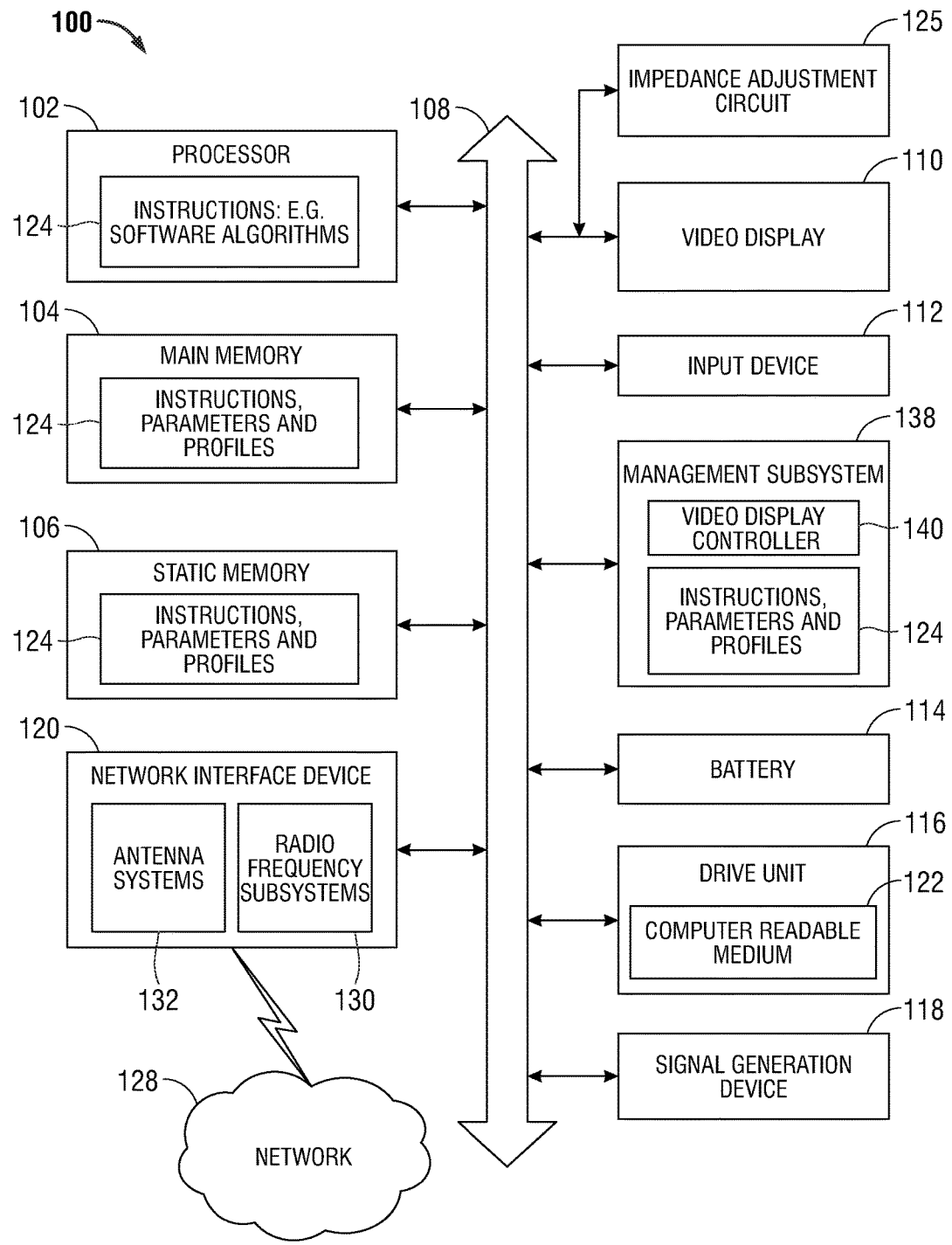
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

The performance of the plurality of wireless transmission systems used with information handling systems (IHS) can vary or be impacted adversely by other connections with the information handling system. For example, a display system operating with an information handling system may generate unwanted radiofrequency (RF) noise due to impedance mismatching. As the need for better display resolution on digital display devices increases, Full HD (FHD) or Ultra High Definition (UHD) displays on consumer products are becoming more common. Further, associated RF emissions for various RF communication technologies (Wifi/3G/4G/5G, etc.) are coming into conflict with unanticipated RF noise from connected devices as well as among the plurality of transmitters and receivers potentially operating at close proximity. The RF communication technologies and display devices may operate at the same time as well lending to conflict of RF noise. Unanticipated RF noise has become a worse problem for product designers and resolution is desirable to maintain good wireless performance.

Traditional digital display device connectors and cables have migrated from the coaxial cable with LVDS connectors, such as DVI connectors and VGA connectors, to flexible printed circuit (FPCB) type or micro-coaxial cables and DisplayPort (eDP) connectors and cables. The impedance control from point to point is more difficult to control due to the high speed nature and mismatch possibilities at various locations for these types of connectors. Thus, the risk of unintended RF noise due to impedance mismatch and the lack of control is heightened. Various mismatches may be unintentionally introduced in the design of digital display device connectors and cables of more current, and even traditional varieties, which contribute to poor RF performance. The unintended mismatches may range from design mismatch by engineers, material production tolerances on the FPCB's, or the differences in impedance requirements between different display control boards and mainboard (MB) connectors such as eDP connectors. Any of these mismatches for digital display device connectors or cables, or other sources of mismatch as understood by those of skill in the art, can cause unwanted noise emission along the connector or cable, such as an eDP cable. The unintended RF noise emission may then be radiated into the system causing performance degradation especially impacting system sensitivity or RF receiver performance. This interference is especially critical for products supporting LTE due to the many bands that are required by the carriers for LTE. Products supporting LTE are increasingly being incorporated into information handling systems. The mismatches may arise due to information handling system user connecting a variety of after-market display devices to an information handling system or due to mobility of an information handling system being used with a variety of digital display devices a several locations. Further, impedance mismatches may even arise in mass production manufacturing settings due to variations on impedance levels among suppliers of parts for a digital display connector, digital display cabling, or a digital display device control boards.

Although previous solutions in place in current products include wrapping to shield off the noisy parts in the hope that the noise emission is suppressed enough to ensure acceptable platform performance, such a solution may be imprecise or possibly ineffective. Such solutions are applied randomly without guarantees as well as not necessarily effective in mass production environment since it is difficult to control the tolerances from operator to operator or from cable or connector supplier to supplier.

In the present disclosure, various embodiments are described for an impedance mismatch control system for use with digital display connectors and cables to assist in detection of impedance mismatch issues that may generate unintended RF noise emissions. Further, the impedance mismatch control system of the present disclosure may further act to remedy detected impedance mismatch between the graphics controller subsystem of an information handling system and a digital display device connector or cable for operative connectivity to a digital display device control board. The impedance mismatch control system of the presently disclosed embodiments may resolve noise emission issues due to impedance mismatch or improper manufacturing implementation with improved precision of matching impedances along the digital display data path to a digital display device. The impedance mismatch control system of the presently disclosed embodiments determines impedance mismatch along the data connection between an information handling system mainboard graphics subsystem, the display device connector cable, and the digital display device control board. For example, the impedance mismatch control system may maintain the same impedance at a mainboard eDP or other connector, along the eDP, FPCB or other display device connector cable itself, and at the control board of the digital display device in various embodiments. As described for several example embodiments, the impedance mismatches may arise due to the different manufacturing processes and controls from among suppliers of parts at each of these parts of an operative data connection between a graphics processing unit (GPU) or other parts of the information handling system mainboard and the digital display device. In one aspect of the embodiments herein, the impedance mismatch control system includes an automated impedance tuner into the design at a digital display device connector location for a digital display cable to connect to at the information handling system. In one example embodiment, the impedance mismatch control system may have an automated impedance tuning circuit located at an eDP connector location. This implementation can either be at the information handling system mainboard side or at the display control side in some embodiments. In several embodiments described herein, the impedance mismatch control system is depicted as operating within the information handling system mainboard side and via the display subsystem. However, it is understood by those of skill that the controller, automated impedance tuning circuit, and impedance detectors may be located at the mainboard side, at the display device control board, or along the display device cables in various embodiments and may even be located at a combination of those locations according to variations on the disclosed embodiments. Further, since display device signals, such as eDP signals, are bi-directional and differential, the implementation of a feedback loop is possible in some embodiments described herein.

In aspects described in embodiments herein, main components of the impedance tuner circuitry may consist of one or more variable capacitors, one or more inductors, one or more directional couplers, power detectors, and a microcontroller. Is understood by those of skill in the art that an impedance tuner circuit in other embodiments may also include a configuration with one or more variable inductors, and that one or more capacitors would not necessarily need to be variable capacitors. Such variations on embodiments of the impedance tuner circuitry are described further herein.

In an example embodiment, the impedance mismatch control system may be a set of code instructions in firmware, software, or hardwired for execution by a micro-controller. It is also understood by those of skill, that the impedance mismatch control system may be a set of code instructions executed by another processor in the information handling system such as a GPU, CPU, graphics subsystem controller, or a specialized or dedicated controller or micro-controller.

In various embodiments, the power detectors are able to measure the power reflected along the display device connector path, such as an eDP path, for the impedance trace measurements. Impedance may be detected via conventional impedance detectors. In an example embodiment, LCR circuits may be used to detect impedance at points along the digital display data path. The impedance trace measurements may be taken at the display device connector along the mainboard of the information handling system as well as on the manufactured digital display device cable. The impedance values may be returned to the micro-controller or other processor executing the impedance mismatch control system to provide for the current impedance values along digital display device cable and that the display device connector at the mainboard being used. The impedance mismatch control system may then adjust the impedance mismatch via the microcontroller by sending a signal to an inductor (L) and variable capacitor (C) impedance tuner circuit to account for the mismatched impedance measured in some embodiments. In an aspect of the embodiment herein, the adjustment for an impedance mismatch may be made relative to a threshold difference level based on predefined set of values thus allowing for an optimized impedance setup for the digital display device connector and cabling to reduce potential unintended RF emissions along that display device data path. In yet a further embodiment, implemented impedance mismatch control system may have a "smart" setup such that variations due to supplier differences or installation differences by users can be accounted for and the impedance auto-tuning exists to ensure good performance upon connection of an information handling system to a digital display device whether in manufacturing at a mass production facility or during use.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

FIG. 1 shows an information handling system 100 capable of administering each of the specific embodiments of the present disclosure. The information handling system 100 can represent the client information handling systems such tablet computer, laptop computers, smart phone systems, other mobile computing devices, servers or systems such as located anywhere within a network, including a remote data center operating virtual machine applications. The information handling system 100 may also execute code 124 for instructions and algorithms such as an operating system and applications that may operate on servers or systems, remote data centers, or on-box in individual client information handling systems such as according to various embodiments herein.

The information handling system 100 may include a processor 102 such as a central processing unit (CPU), a graphics processing unit (GPU), control logic or some combination of the same. In an embodiment such as described herein, processor 102 may include a plurality of processors that comprise a chipset including a CPU, GPU, and additional control logic as well as support bridge logic for various processor architectures as understood by those of skill in the art. Further, information handling system 100 can include processing resources for executing machine-executable code, such as a central processing unit (CPU), a programmable logic array (PLA), an embedded device such as a System-on-a-Chip (SoC), or other control logic hardware. Any of the processing resources may operate to execute code that is either firmware or software code.

Information handling system 100 can also include one or more computer-readable medium 122 for storing machine-executable code, such as software or data. Additional components of information handling system 100 can include one or more storage devices 104, 106, and 116 that can store machine-executable code, one or more communications ports 120 for communicating with external devices, and various input and output (I/O) devices (e.g., 110, 112, and 118), such as a keyboard, a mouse, and a video display 110. Moreover, the information handling system 100 can include memory such as main memory 104, static memory 106, and drive unit 116 (volatile (e.g. random-access memory, etc.), nonvolatile (read-only memory, flash memory etc.) or any combination thereof). Static memory 106 or drive unit 116 or both may include various types of solid state memory as understood in the art. As an example, the SSD 106 may further include an SSD controller with onboard logic for controlling memory drive operations as well as a flash controller component for controlling one or more the flash memory packages. The information handling system 100 may be a host for the SSD and connect via host interface logic as is described in some embodiments herein.

The information handling system 100 can also include one or more buses 108 operable to transmit communications between the various hardware components such as any combination of various input and output (I/O) devices. Portions of an information handling system may themselves be considered information handling systems. Additionally, the information handling system 100 may include an input device 112, such as a keyboard, and a cursor control device, such as a mouse, touchpad, or gesture or touch screen input. The information handling system 100 can also include a signal generation device 118, such as a speaker or remote control. The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

As shown, the information handling system 100 may further include a video display unit 110 (also referred to as a digital display device), such as a liquid crystal display (LCD), an organic light emitting diode (OLED), a flat panel display, a solid state display, or a cathode ray tube (CRT). The digital display devices 110 may be connected to a graphics processing unit or other processor 102. The information handling system 100 can include a set of instructions 124 that can be executed to cause the computer system to perform any one or more of the methods or computer based functions disclosed herein including for the impedance mismatch control system of the present disclosure. In other aspects, a management subsystem 138 may include one or more controller circuits, such as controller 140, such as a video display controller or dedicated micro-controller, which may execute a set of instructions 124 (shown with respect to management subsystem 138) that is hard wired, firmware, or software logic implemented to perform any portion of one or more of the methods or systems disclosed in embodiments herein.

Connection to digital display device 110 may also be managed by a management subsystem 138 that may operate one or more controllers including the video display controller 140 in an example embodiment. The video display controller 140 may contain or access code instructions in firmware, software, or may be hard coded to execute instructions to perform any one or more of the methods or computer based functions disclosed herein for impedance mismatch detection and adjustment. For example, information handling system 100 includes one or more sets of firmware code instructions used with the video display controller to operate the impedance mismatch control system and the various aspects of the impedance adjustment circuit 125 and the digital display device 110.

In an aspect the hard wired, firmware or software logic 124 of the management subsystem 138 may operate as a display management subsystem that includes an impedance mismatch control system of the present disclosure. Such a controller 140 in a display management subsystem for execution of an impedance mismatch control system of the present disclosure may be located near a display device connector for connection to a video display 110. Additional circuitry may be included with the display device connector and work with the controller 140 operating an impedance mismatch control system that may serve as an impedance adjustment circuit 125 for a display connector. In an embodiment of the present disclosure, the digital display device 110 may be connected to the information handling system 100 via a display device connector including an impedance adjustment circuit 125 to which display device cabling may be connected (not shown). It is understood that a variety of types of display cabling may be used including coaxial cabling. In an example embodiment, coaxial cabling with LVDS connectors, such as VGA, or more current DisplayPort (eDP) connectors for Full HD (FHD) or Ultra High Definition (UHD) display systems may be used. In a further example, to support FHD/UHD display device systems, flexible printed circuit (FPCB) type and micro-coaxial cabling may be used.

Information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100 such as information handling system 100 boot-up operations. In another embodiment (not illustrated), software or BIOS/FW code may reside in another storage medium of information handling system 100. For example, software or firmware code can reside in static memory 106, drive 116, in a ROM (not illustrated) associated with information handling system 100 or other memory. In other aspects, application programs and BIOS/FW code sourced from remote locations, for example via a hypervisor or other system, that may be associated with various devices of information handling system 100 partially in memory 104, storage system 106, drive 116 or in a storage system (not illustrated) associated with network channel 120 or any combination thereof. Software application programs 124 and BIOS/FW code 124 can each be implemented as single programs, or as separate programs carrying out the various features as described herein. Application program interfaces (APIs) such Win 32 API may enable application programs 124 to interact or integrate operations with one another.

Main memory 104 may contain computer-readable medium (not shown), such as RAM in an example embodiment. Static memory 106 may contain computer-readable medium (not shown), such as NOR or NAND flash memory in some example embodiments. The disk drive unit 116 may include a computer-readable medium 122 such as a magnetic disk in an example embodiment. The computer-readable medium of the memory and storage devices 104, 106, and 116 may store one or more sets of instructions 124 such as software code corresponding to the present disclosure. In some embodiments, the impedance mismatch control system of the present disclosure may be operated not entirely at microcontroller 140, but may be part of firmware or software 124 in BIOS or operating via application execution by processors 102 or elsewhere in the information handling system 100.

The information handling system may also have a management subsystem 138 with a plurality of information handling system subsystems for control of a plurality of systems, including a plurality of display devices 110. For example, management subsystem 138 may interface with a variety of controllers to execute policy or enable operation of various information handling subsystems. In an example embodiment, an video display controller 140 may access other elements display device connector, an impedance adjustment circuit 125 or static memory 106 shown in FIG. 1 to execute the functions of the impedance mismatch control system of the present disclosure, for example, via one or more buses 108. In some aspects, system-level operation or component-level operation can be managed via the management subsystem 138 as well.

The information handling system may include a power source such as battery 114 or an A/C power source. Battery 114 may include a smart battery system that tracks and provides power state data 126 in some embodiments.

The information handling system 100 can also include a network interface device 120 that may be wired network adapter or may be a wireless adapter as shown. Wireless network interface devices will include antenna subsystems 132 and radio frequency control subsystems 130 which may work in connection with the management subsystem 138. As a wireless adapter, network interface device 120 can provide connectivity to a network 128. A wired network interface is also contemplated (not shown). Radio frequency subsystems 130 and antenna subsystems 132 may include transmitter/receiver circuitry, wireless controller circuitry, amplifiers and other circuitry for wireless communications. Each radiofrequency subsystem 130 may communicate with one or more wireless technology protocols.

In some embodiments, dedicated hardware implementations such as application specific integrated circuits (ASIC), programmable logic arrays (FPGA) and other hardware devices can be constructed to operate as video display controllers, a controller executing an impedance mismatch control system, or impedance adjustment circuitry to implement one or more of the methods described herein. Applications that may include the apparatus and systems of various embodiments of the impedance mismatch control system and impedance adjustment circuitry and can broadly include a variety of electronic systems hardwired to execute instructions or computer systems executing code instructions. One or more embodiments described herein may implement functions using two or more specific interconnected hardware modules or devices with related control and data signals that can be communicated between and through the modules, or as portions of an ASIC or an FPGA. Accordingly, the present system of the disclosure herein may encompass software, firmware, and hardware implementations.

In accordance with various embodiments of the present disclosure, the methods described herein may be implemented by firmware executed by one or more controllers or by software programs executable by a computer system. Further, in an exemplary, non-limited embodiment, implementations can include distributed processing, component/object distributed processing, and parallel processing to execute the methods of impedance mismatch control and adjustment of the present disclosure.

Figure 2:
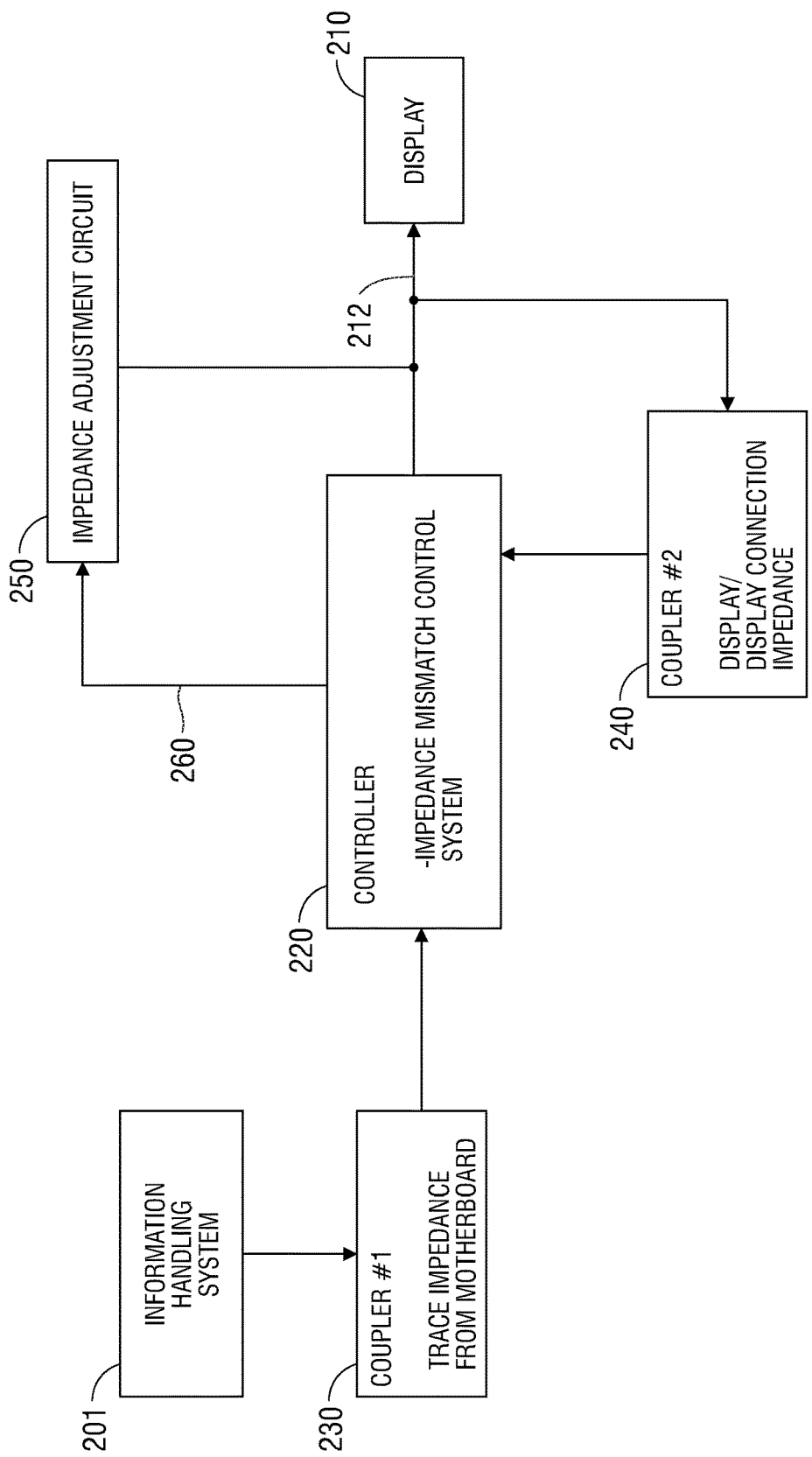
FIG. 2 is a block diagram illustrating a controller and impedance mismatch control system according to an embodiment of the present disclosure.

FIG. 2 shows an example architecture implementing an impedance mismatch control system 220 in a controller such as a display device controller, a processor such as a GPU, another designated controller, or hardwired FPGA or ASIC according to one embodiment of the present disclosure. The example architecture of FIG. 2 may be implemented in connection with a display device connector circuit for an information handling system 201 for connection to a digital display device 210. Controller or processor executes code instructions for the impedance mismatch control system 220 described in embodiments herein and may receive trace input measurements from a first coupler 230 for determining impedance measurements for a display data signal line in the display device connector of the information handling system. The first coupler 230 may include a power detector or LCR circuit for detecting impedance of the display data signal line on the main board or graphics board of information handling system 201 in various embodiments. A second coupler 240 may be attached to a point further along the graphics data signal path to the digital display 210 from the digital display connector. The second coupler is coupled to a point past the display device connector to detect impedance along the line 212 of the digital display data path. For example, the impedance may be connected along a display cable 212 such as an eDP cable or may be detected at a control board of the digital display 210. In some embodiments, the second coupler 240 may be installed to detect impedance of the digital display cable 212 at the interface with the digital display cable 212 used to connect to digital display 210. In an embodiment, power may be detected from the first coupler 230 and from the second coupler 240. Impedance measurement is made through coupling power at the first coupler 230 and the second coupler 240 through an LCR circuit to determine differential impedance values between the two locations. The differential impedance values may then be stored for use by the controller to determine differences in impedance. Impedance measurements may include both direct impedance measurements or a measurement of differential impedance.

The impedance mismatch control system 220 may compare impedance measurements from the first coupler 230 and the second coupler 240 described above to determine the extent, if any, of a mismatch in impedance between the information handling system display device connector and a point further up the digital display data path 212 to the display device 210. If an impedance mismatch is determined to be significant enough, then it is determined whether the mismatch requires correction to increase impedance of the digital display connector or to decrease the impedance of the digital display connector. In accordance with this latter determination, an adjustment signal 260 is sent to impedance adjustment circuit 250 to adjust the impedance of the digital display connector to match the impedance of the display cable or the digital display 210 control board. In an example embodiment, the impedance adjustment circuit includes one or more inductors and capacitors to condition the impedance on the digital display data signal line for the digital display connector. Embodiments of the impedance adjustment circuit 250 are shown herein. At least one of the capacitors or inductors is variable such that a signal may yield an adjustment in capacitance or inductance. An adjustment to the capacitance or inductance of the impedance adjustment circuit may be made to alter the impedance of the display device connector in accordance with correcting for the determined mismatch.

Figure 3:
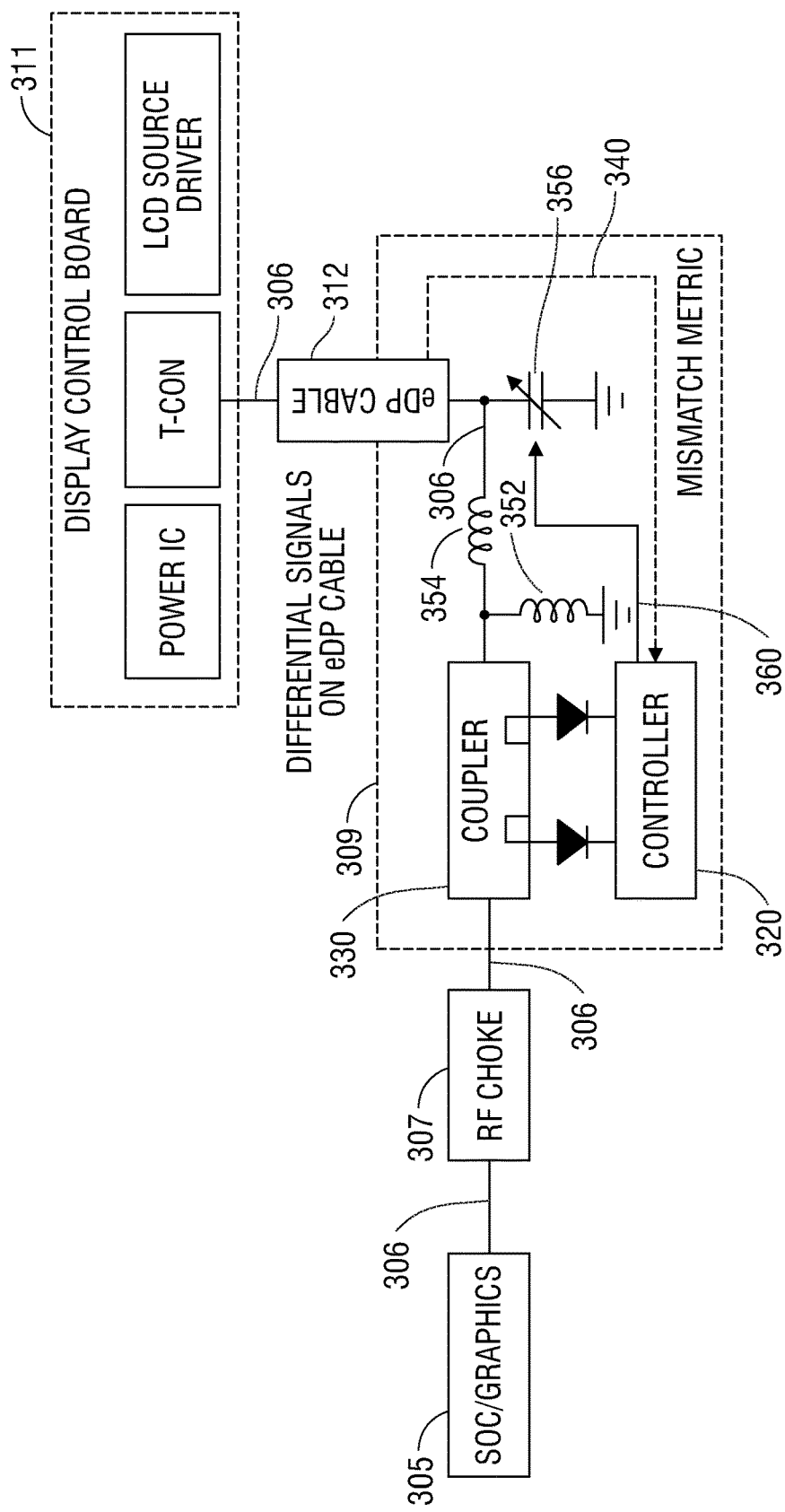
FIG. 3 is a block diagram illustrating an aspect of an impedance mismatch control system and impedance adjustment circuit according to an embodiment of the present disclosure.

FIG. 3 shows an example display device connector implementing an impedance mismatch control system via controller 320. The example display device connector 309 is connected to a graphics system 305, such as a silicon-on-chip (SOC) graphics driver of an information handling system. Digital display data path 306 may pass through an RF choke to reduce unwanted RF transmission or radiation in an optional embodiment. Digital display path 306 may progress through a directional coupler 330 which is a first coupler for detecting impedance along the digital display data path 306 in display connector 309. Directional coupler 330 as shown in the embodiment of FIG. 3 may provide a digital display connector impedance measurement to controller 320 to implement an impedance mismatch determination according to embodiments of the impedance mismatch control system of the present disclosure. Impedance measurements and detection may utilize a LRC detector circuit such as an LRC meter or bridge circuit to determine ratio of voltage, current, phase, resistivity for a variety of alternating currents of various frequencies on the digital display data path as understood by those of skill in the art. Other types of impedance detectors may be used in other embodiments as are known by those of skill in the art. The impedance detection circuit may generate detected impedance factors and deliver the detected measurements to controller 320 via a unidirectional coupler such as via the diodes depicted in FIG. 3.

Digital display data path 306 will pass through an impedance adjustment circuit in the digital display connector 309 as shown. The impedance adjustment circuit may include an inductor 352 operatively coupled to ground or a reference voltage, inductor 354 in series with the digital display data path 306 and a variable capacitor 356 operatively coupled to ground or a reference voltage in parallel to inductor 352.

Digital display connector 309 is operatively connected to a digital display cable 312 such as cabling that may accommodate FHD or UHD display data. In an example embodiment, digital display cabling may include an eDP cable 312 for connection to a digital display board 311. The digital display control board may include display control components such as a power integrated circuit, timing control (T-Con), and an LCD or OLED source driver for operation of the digital display as understood by those of skill in the art. Digital display data path 305 terminates at the display control board 311 of the digital display device.

A second coupled impedance measurement 340 may be taken at the digital display cabling interface or at a point further along the digital display data signal path 306 toward the digital display. The second coupler may detect impedance at any point further along the digital display data signal path 306 including at the digital display cable 312 or at the display control board 311 in various embodiments. The second impedance measurement 340 is provided to controller 320 for comparison to the first impedance measurement of the digital display connector via coupler 330. The impedance mismatch control system at controller 320 may then make a determination of whether there is mismatch or the magnitude of any impedance mismatch between the digital display connector 309 and a point further along the digital display data path 306 toward display control board 311 such as at digital display cabling 312.

If a threshold level of impedance mismatch is determined by controller 320, then an adjustment signal 360 is sent to the impedance adjustment circuit. In one embodiment, if the impedance mismatch is detected such that the display connector impedance is substantially lower than the impedance of the point further along the digital display data signal line such as cable 312, then a signal is sent to the variable capacitor 356 to increase capacitance. It is understood that an increase in capacitance at variable capacitor 356 in parallel with inductance 352 will increase the digital display connector impedance to more closely match the impedance further along the digital display data signal path 306. In another embodiment, an adjustment signal may be sent instead to an inductor such as inductor 352 or inductor 354 either of which may be a variable inductor. A decrease in inductance at inductor 352 or an increase in inductance at 354 may adjust to increase digital display connector impedance to better match impedance further along the digital display data path 306.

In an embodiment, if the impedance mismatch is detected such that the display connector impedance is substantially higher than the impedance of the point further along the digital display data signal line (e.g., at digital display cable 312), then a signal is sent to the variable capacitor 356 to decrease capacitance. It is understood that a decrease in capacitance at variable capacitor 356 in parallel with inductance 352 will decrease the digital display connector impedance to more closely match the impedance further along the digital display data signal path 306. In another embodiment, an adjustment signal may be sent instead to an inductor such as inductor 352 or inductor 354 either of which may be a variable inductor. An increase in inductance at inductor 352 or a decrease in inductance at 354 may adjust to decrease digital display connector impedance to better match impedance further along the digital display data path 306.

Figure 4:
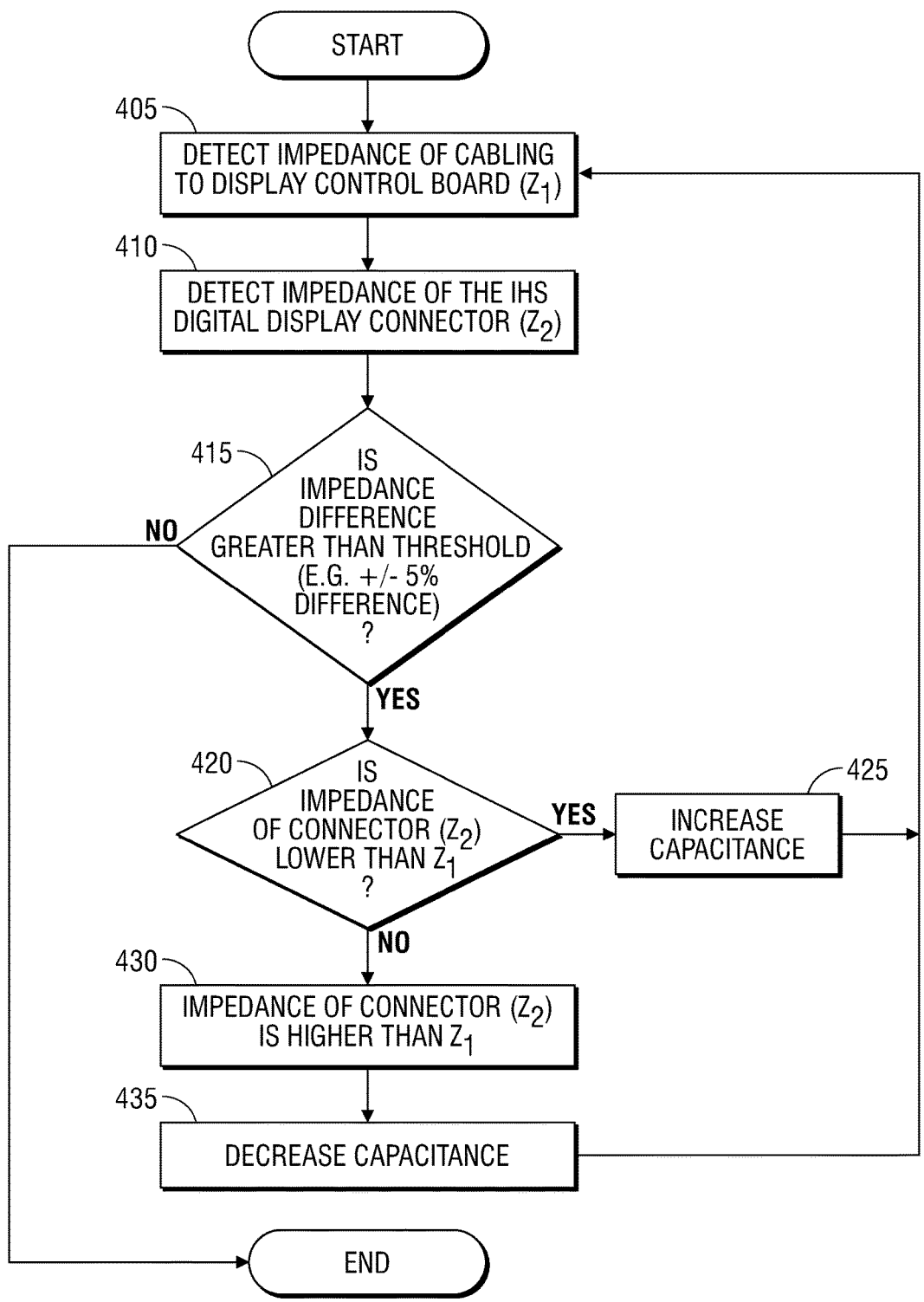
FIG. 4 is a flow diagram illustrating a method of determining impedance mismatch and control according to an embodiment of the present disclosure.

FIG. 4 is a flow chart showing an execution of code for an impedance mismatch control system for a digital display data path to a digital display device from an information handling system according to an embodiment of the present disclosure. Flow begins at 405 where the impedance mismatch control system code being executed on a controller receives an impedance measurement ($Z_1$) from the connection cabling or display control board itself. As described, an impedance detector may be connected to the digital display data path at the display cabling or the connector end of the display cabling for the coaxial display cable. The display cabling is connected between the digital display connector on the information handling system and the control board of the digital display device. As described above, an impedance detector of the digital display data signal line in some embodiments may include a LCR bridge or LCR meter connected to detect signal power, signal voltage, and phase shift data as understood by those of skill. Impedance of the display cabling or another point in the digital display data path beyond the display connector of the information handling system is detected and the impedance signal returned to the impedance mismatch control system.

Proceeding to 410, the impedance mismatch control system receives an impedance measurement ($Z_2$) from the digital display data path in the information handling system. In an embodiment, a coupler will detect impedance typically at the display device connector of the information handling system. The coupler may connect to an impedance detector to detect voltage, current, and phase shift for signals on the digital display data path for the impedance measurement of the digital display connector on the main board, on a graphics card, or elsewhere in the information handling system. The impedance detector may include an LCR circuit as understood by those of skill in the art to determine impedance along the digital display data signal path. In one embodiment, as shown in FIG. 3, the coupler may be directional in that the detection of impedance from the digital display data signal path is coupled via directional diodes.

The impedance mismatch control system will determine magnitude of the impedances $Z_1$ and $Z_2$ detected and compare the impedance to determine if a mismatch exists and the magnitude of the impedance difference in the impedance mismatch. At 415, the impedance mismatch control system will detect the difference between the measured impedances $Z_1$ and $Z_2$ and compare to a threshold level of impedance mismatch. In an example embodiment, the impedance of the digital display connector $Z_2$ on the information handling system is compared for variance from the measured impedance $Z_1$ from a point further along the digital display data path toward the digital display device. In an example embodiment, $Z_1$ may be measured at the digital display cable. It is understood that the impedance mismatch control system could instead determine the variance of $Z_1$ as compared to a measured $Z_2$ instead to determine if a threshold level of impedance mismatch exists in other embodiments.

In the present example embodiment however, if the variance of $Z_2$ from $Z_1$ is greater than a threshold percentage variance level, then an impedance mismatch is determined and impedance adjustment may be needed. In an example embodiment, the threshold variance percentage difference in impedance between $Z_2$ from $Z_1$ may be 5%. It is understood that in other embodiments any percentage or a hard value of impedance deviation may be used as a threshold to determine whether a significant impedance mismatch exists between $Z_2$ and $Z_1$. Further at 415, the impedance mismatch control system of the present disclosure will determine whether the impedance mismatch is such that $Z_2$ is at a greater impedance than $Z_1$ requiring a reduction in $Z_2$. Alternatively, the impedance mismatch control system of the present disclosure will determine if the impedance mismatch is such that $Z_2$ has a lower impedance than $Z_1$ requiring an impedance adjustment increase at $Z_2$.

Figure 5:
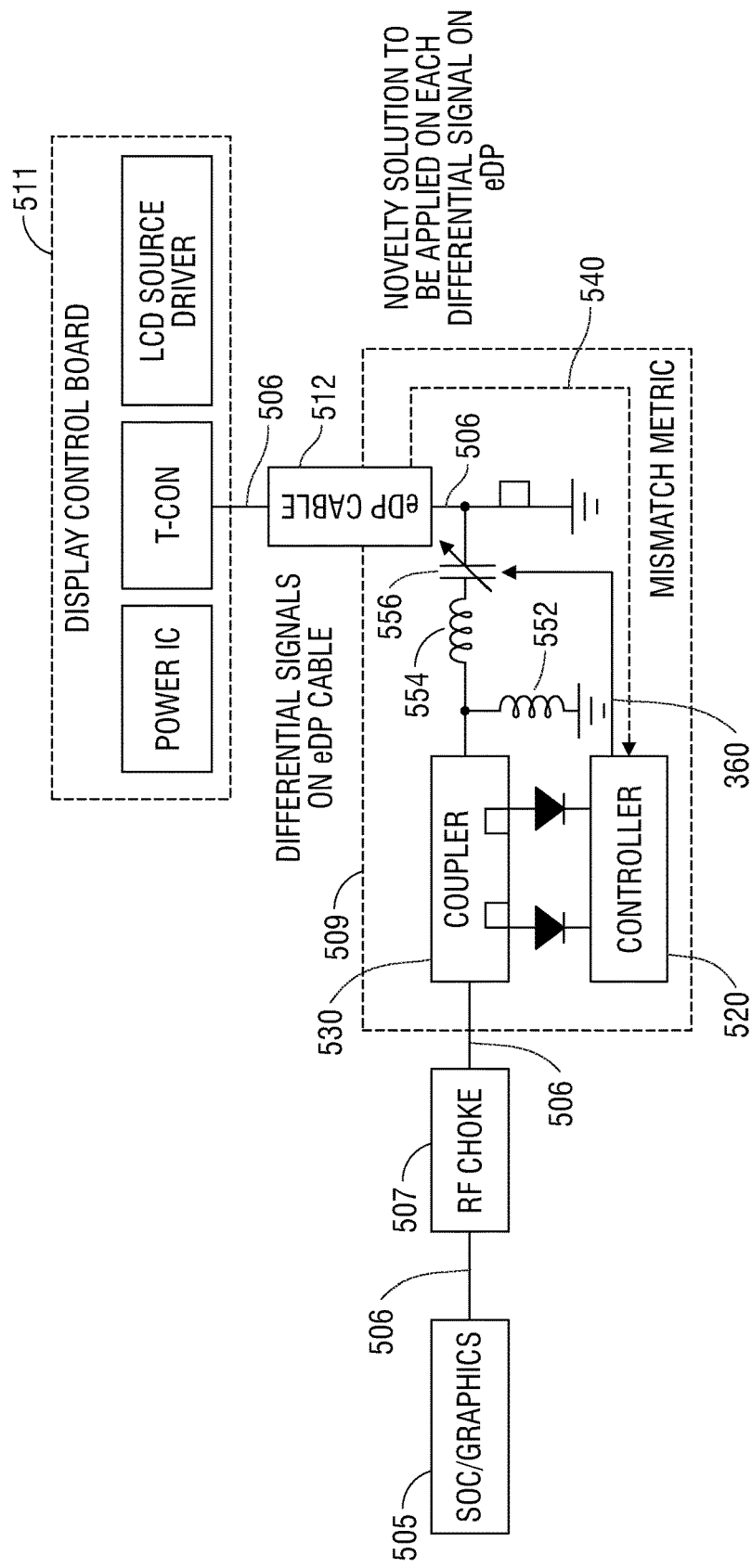
FIG. 5 is a block diagram illustrating another aspect of an impedance mismatch control system and impedance adjustment circuit according to an embodiment of the present disclosure.

If no significant impedance mismatch is detected, then the method ends with no impedance adjustment via an impedance adjustment circuit as shown in FIG. 5. However if an impedance mismatch is detected above a threshold impedance variance or deviation, then flow proceeds to 420 to determine whether impedance $Z_2$ is less than impedance $Z_1$ by the designated threshold impedance variation amount or deviation level. At 420, if the impedance mismatch is in the direction of $Z_2$ being lower than $Z_1$ by the designated threshold impedance variance or deviation level, then flow proceeds to 425 where a signal is sent to increase capacitance, such as at variable capacitor 356 if FIG. 3. Increasing capacitance at the variable capacitor in an impedance adjustment circuit such as shown in FIG. 3 will increase impedance $Z_2$ at the digital display connector of the information handling system. This adjustment to impedance $Z_2$ will increase $Z_2$ to more closely match impedance $Z_1$ at the display cable or another point further downstream from the digital display connector. After capacitance is adjusted at 425, flow returns to 410 and the impedance mismatch control system may reassess whether there is an impedance mismatch according to the method above.

If $Z_2$ is not less than $Z_1$ at 420, then flow proceeds to 430 where it is determined that the detected impedance mismatch has impedance $Z_2$ that is greater than $Z_1$ by the designated threshold impedance deviation. Flow then proceeds to 435, where the impedance mismatch control system sends a signal to the variable capacitor, such as variable capacitor 356 of FIG. 3, to decrease capacitance. In the impedance adjustment circuit of FIG. 3, the decrease of capacitance at variable capacitor 356 will increase impedance $Z_2$ to adjust toward an impedance match between $Z_2$ and $Z_1$. After capacitance is adjusted at 435, flow returns to 410 and the impedance mismatch control system may reassess whether there is an impedance mismatch according to the method above. If the system determines no impedance mismatch during another round of assessment, then the process may end.

It should be understood that the method recited above may occur in any order or aspects may occur simultaneously. Moreover, certain steps of the method not recited or recited in other example embodiments herein may be combined and conducted as understood by those of skill. Further, not all aspects of the methods of FIG. 4 need be performed in all embodiments contemplated. For example, impedance $Z_1$ taken at a point downstream from the information handling system display connector toward the digital display device may be measured and transmitted to the controller operating the impedance mismatch control system from a digital display device in some embodiments. In other embodiments, no order of impedance measurements is required and any order or simultaneous impedance measurements may be taken.

FIG. 5 shows an example display device connector 509 implementing an impedance mismatch control system via controller 520. The example display device connector 509 in FIG. 5 is similar to the embodiment of FIG. 3, except that the impedance adjustment circuit disclosed includes a variable capacitor in series with the digital display data path 506 in the present embodiment. The example display device connector 509 is connected to a graphics system 505, such as a silicon-on-chip (SOC) graphics driver of an information handling system. Digital display data path 506 may pass through an RF choke to reduce unwanted RF transmission or radiation in an optional embodiment. Digital display path 506 may progress through a directional coupler 530 which is a first coupler for detecting impedance along the digital display data path 506 in display connector 509. Directional coupler 530 as shown in the embodiment of FIG. 5 may provide a digital display connector impedance measurement to controller 520 to implement an impedance mismatch determination according to embodiments of the impedance mismatch control system of the present disclosure. As described elsewhere, impedance measurements and detection may utilize a LRC detector circuit such as an LRC meter or bridge circuit to determine ratio of voltage, current, phase, resistivity for a variety of alternating currents of various frequencies on the digital display data path in the display connector of the information handling system in some embodiments. It is understood that other impedance detection methods may also be used as described further herein in other embodiments.

Digital display data path 506 will pass through an impedance adjustment circuit in the digital display connector 509 as shown. The impedance adjustment circuit may include an inductor 552 connected to ground or a reference voltage, inductor 554 in series with the digital display data path 506 and a variable capacitor 556 also in series with the digital display data path 506 and inductor 554.

Digital display connector 509 is operatively connected to a digital display cable 512 such as cabling that may accommodate FHD or UHD display data. In an example embodiment, digital display cabling may include an eDP cable 512 for connection to a digital display board 511. The digital display control board may include display control components such as a power integrated circuit, T-Con, and an LCD, OLED, or other source driver for operation of the digital display as understood by those of skill in the art. Digital display data path 505 terminates at the display control board 511 of the digital display device.

A second coupled impedance measurement 540 may be taken at the digital display cabling interface or at a point further along the digital display data signal path 506 toward the digital display. The second coupler may detect impedance at any point further along the digital display data signal path 506 including along the digital display cable 512 or at the display control board 511 in various embodiments. The second impedance measurement 540 is provided to controller 520 for comparison to the first impedance measurement of the digital display connector via coupler 530. The impedance mismatch control system at controller 520 may then make a determination of whether an impedance mismatch exists or the magnitude of any impedance mismatch between the digital display connector 509 and a point further along the digital display data path 506 toward display control board 511. In an example embodiment, the impedance measurement further along the digital display path 506 may be taken at digital display cabling 512 or at a connector on the interface end of display cabling 512.

If a threshold level of impedance mismatch is determined by controller 520, then an adjustment signal 560 is sent to the impedance adjustment circuit. In one embodiment, if the impedance mismatch is detected such that the display connector impedance is lower than the impedance of the point further along the digital display data signal line, such as at digital display cable 512, then a signal is sent to the variable capacitor 556 to increase capacitance. It is understood that an increase in capacitance at variable capacitor 556 relative to inductance 552 and 554 will increase the digital display connector impedance to more closely match the impedance further along the digital display data signal path 506. In another embodiment, an adjustment signal may be sent instead to an inductor such as inductor 552 or inductor 554 either of which may be a variable inductor. A increase in inductance at inductor 552 or an decrease in inductance at 554 may adjust to increase digital display connector impedance to better match impedance further along the digital display data path 506.

In an embodiment, if the impedance mismatch is detected such that the display connector impedance is higher than the impedance of the point further along the digital display data signal line, such as at digital display cable 512, then a signal is sent to the variable capacitor 556 to decrease capacitance. It is understood that a decrease in capacitance at variable capacitor 556 relative to inductance 552 or 554 will decrease the digital display connector impedance to more closely match the impedance further along the digital display data signal path 506. In another embodiment, an adjustment signal may be sent instead to an inductor such as inductor 552 or inductor 554 either of which may be a variable inductor. A decrease in inductance at inductor 552 or an increase in inductance at 554 may adjust to decrease digital display connector impedance to better match impedance further along the digital display data path 506.

Figure 6:
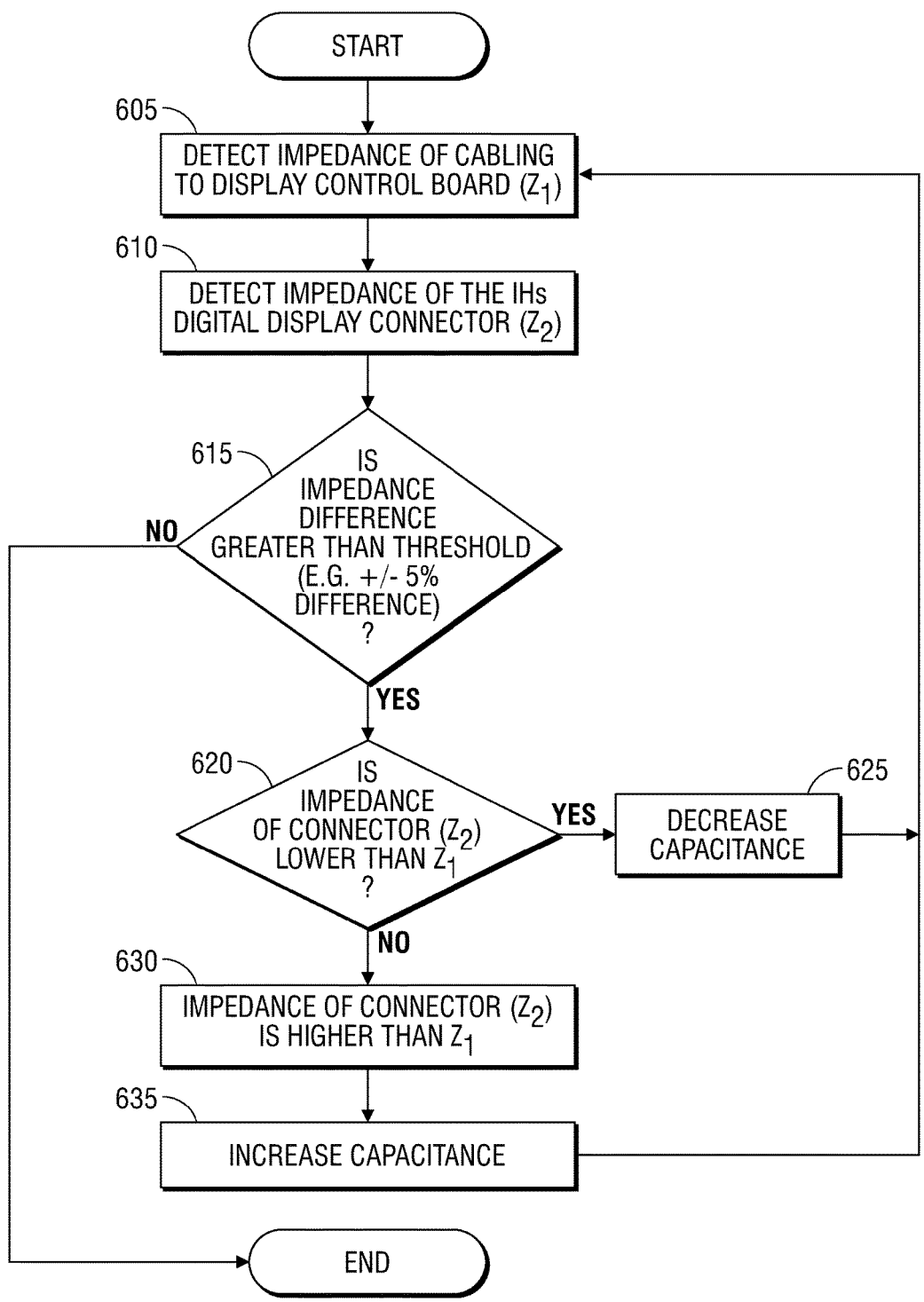
FIG. 6 is a flow diagram illustrating another method of determining impedance mismatch and control according to an embodiment of the present disclosure.

FIG. 6 is a flow chart showing an execution of code for an impedance mismatch control system for a digital display data path to a digital display device from an information handling system according to another embodiment of the present disclosure. FIG. 6 describes the operation of the impedance mismatch control system in connection with the impedance adjustment circuit as shown in FIG. 5. Flow begins at 605 where the impedance mismatch control system code being executed on a controller receives an impedance measurement ($Z_1$) from the connection cabling or display control board of the digital display device. An impedance detector may be connected to the digital display data path at the display cabling or the connector end of the display cabling for the coaxial display cable connected between the digital display connector of the information handling system and the control board of the digital display device according to one example embodiment. In other embodiments, the impedance detector may be coupled to any point along the digital display cabling or at the control board of the digital display device. As described above, an impedance detector of the digital display data signal line in some embodiments may include a LCR bridge or LCR meter connected to detect signal power, signal voltage, and phase shift data as components of an impedance measurement as understood by those of skill. Impedance of the display cabling or another point in the digital display data path beyond the display connector of the information handling system is detected and the impedance measurement is returned to the impedance mismatch control system.

Proceeding to 610, the impedance mismatch control system receives an impedance measurement ($Z_2$) from the digital display data path in the information handling system. In an embodiment, a coupler will detect impedance at the display device connector for the information handling system. The coupler may connect to an impedance detector to detect voltage, current, and phase shift for signals on the digital display data path for the impedance measurement as understood in the art and described herein. The digital display connector may be on the main board or on a graphics card of the information handling system in some embodiments. The impedance detector may include an LCR circuit, as understood by those of skill, in the art to determine impedance along the digital display data signal path. In one embodiment, as shown in FIG. 5, the coupler 530 may be directional in that the detection of impedance from the digital display data signal path is coupled via directional diodes.

The impedance mismatch control system will determine magnitude of the impedances $Z_1$ and $Z_2$ and compare the impedance to determine if a mismatch exists and how great a difference there is in the impedance mismatch. At 615, the impedance mismatch control system will detect the difference between the measured impedances $Z_1$ and $Z_2$ and compare to a threshold variance level of impedance mismatch. In an example embodiment, the threshold variance level of impedance mismatch may be a variance level of one measured impedance as compared to the other measured impedance level. For example, the impedance of the digital display connector $Z_2$ on the information handling system is compared for variance from the measured impedance $Z_1$ of a point further along the digital display data path toward the digital display device. It is understood that the impedance mismatch control system could instead determine the deviation of $Z_1$ from a measured $Z_2$ instead to determine if a threshold level of impedance mismatch exists in other embodiments. In yet another embodiment, a threshold difference amount or deviation level of measured impedances between $Z_1$ and $Z_2$ may serve as a threshold impedance mismatch variance level.

In the present example embodiment, if the deviation of $Z_2$ from $Z_1$ is greater than a threshold percentage impedance variance difference, then an impedance mismatch is determined and impedance adjustment may be needed. In an example embodiment, the threshold percentage difference in impedance between $Z_2$ from $Z_1$ may be 5% variance. It is understood that in other embodiments any percentage or a hard value of impedance deviation may be used as a threshold to determine a significant impedance mismatch between $Z_2$ and $Z_1$. Further at 615, the impedance mismatch control system of the present disclosure will determine whether the impedance mismatch is measured such that $Z_2$ is greater than $Z_1$ requiring a reduction in $Z_2$, or if the impedance mismatch is measured such that $Z_2$ is less than $Z_1$ requiring an impedance adjustment increase at $Z_2$.

When no significant impedance mismatch is detected or a detected mismatch does not meet an impedance mismatch variance threshold, then the method ends with no impedance adjustment. However if an impedance mismatch is detected above a threshold impedance variance level between impedance $Z_1$ measured from the cabling or other downstream impedance and impedance at the digital display connector $Z_2$, then flow proceeds to 620 to determine whether $Z_2$ is less than $Z_1$ by more than the designated threshold impedance deviation. At 620, if the impedance mismatch determines that impedance of the digital display connector $Z_2$ is lower than $Z_1$, then flow proceeds to 625 where a signal is sent to increase capacitance at the impedance adjustment circuit such as the example embodiment shown in FIG. 5. In the example embodiment of FIG. 5, capacitance may be increased via variable capacitor 556, which will yield an increased impedance $Z_2$ at the digital display connector of the information handling system. This adjustment to increase impedance $Z_2$ is intended to adjust impedance $Z_2$ to matching better with impedance $Z_1$ at the display cable or another point further downstream from the digital display connector toward the digital display device. After capacitance is adjusted at 625, flow returns to 610 and the impedance mismatch control system may reassess whether there is an impedance mismatch according to the method above.

If $Z_2$ is not less than $Z_1$ at 620, then flow proceeds to 630 where it is determined that the detected impedance mismatch has impedance $Z_2$ that is greater than $Z_1$ by more than designated threshold impedance variance. Flow then proceeds to 635, where the impedance mismatch control system sends a signal to impedance adjustment circuit to decrease impedance $Z_2$ to match impedance $Z_1$. In an example embodiment, a signal may be sent to a variable capacitor, such as variable capacitor 556 of FIG. 5, to decrease capacitance. In the impedance adjustment circuit of the embodiment of FIG. 5, a decrease in capacitance at variable capacitor 556 will decrease impedance $Z_2$ to adjust toward an impedance match between $Z_2$ and $Z_1$. After capacitance is adjusted at 635, flow returns to 610 and the impedance mismatch control system may reassess whether there is still an impedance mismatch according to the method above. If the system determines no impedance mismatch during another round of assessment, then the process may end.

It should be understood that the method recited above may occur in any order or aspects may occur simultaneously. Moreover, certain steps of the method not recited or recited in other example embodiments herein may be combined and conducted as understood by those of skill. Further, not all aspects of the methods of FIG. 6 need be performed in all embodiments contemplated. For example, impedance $Z_1$ taken at a point downstream from the information handling system display connector toward the digital display device may be measured and transmitted to the controller operating the impedance mismatch control system from a digital display device in some embodiments. In other embodiments, no order of impedance measurements is required and any order or simultaneous impedance measurements may be taken.

While embodiments have been described herein with respect to specific types controller activity in execution of an impedance mismatch control system and to specific types of digital display connector performance, other embodiments may be applied and include additional controller activity relating to impedance mismatch assessment and impedance adjustments that may reside in controllers at the digital display device or elsewhere in the information handling system. In such embodiments, impedance assessment and adjustment may be communicated to an impedance adjustment circuit to correct impedance of either a digital display connector at an information handling system or to correct the impedance at digital display cabling or a digital display control board. For example, if it is desirable to adjust impedance of the display cabling rather than the impedance of the display connector on the information handling system to match impedances, then an impedance adjustment circuit may be implemented as part of the microcoaxial display cable such as an eDP cable. Further, it is contemplated that any impedance adjustment circuit may instead us a variable inductor instead of a variable capacitor as described above or may use both a variable inductor and a variable capacitor. As understood by those of skill in the art, varying inductance to either increase or decrease inductance at portions of the impedance adjustment circuits depicted above may also work to match impedances.

In the methods described herein a flow of method steps is depicted, however it is understood that one or more of the steps may be formed in any order and some steps may be performed simultaneously. It is also understood that in some embodiments not all steps may be performed or additional steps may be added as understood by those of skill in the art. Finally, it is understood that one or more steps from each of the method embodiments disclosed may be combined in various ways to provide combination embodiments.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," "system" or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such central processor units or other processors provided by companies such as Intel®, AMD®, ARM® and others such that the software and firmware are capable of operating a relevant environment of the information handling system. Other processors, controllers, or other such devices may also have embedded firmware or software capable of operating a relevant environment of an information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a display device connector for connecting to a digital display device;
    a controller executing instructions of an impedance mismatch control system for determining impedance differences along an operative connection from the display device connector to the digital display device;
    the controller receiving a display device connector first impedance measurement to detect impedance level of a motherboard and the display device connector of the information handling system and a second impedance measurement from a point further along the operative connection between the display device connector and the digital display device to detect impedance level of a currently-connected display control board and display cable or display trace; and
    the controller executing the impedance mismatch control system to determine an impedance mismatch level by determining that the impedance difference between the display device connector and the point further along the operative connection between the display device connector and the digital display device exceeds an impedance mismatch variance threshold level.

2. The information handling system of claim 1 further comprising:
    the controller transmitting a signal to adjust impedance via an impedance adjustment circuit.

3. The information handling system of claim 1 wherein the impedance mismatch variance threshold level is a difference of the display device connector impedance at +/−5% of the second impedence measurement.

4. The information handling system of claim 1 wherein the second impedance measurement from the point further along the operative connection between the display device connector and the digital display device is a digital display device connector cable impedance measurement.

5. The information handling system of claim 1 wherein the second impedance measurement from the point further along the operative connection between the display device connector and the digital display device is a digital display device control board impedance measurement.

6. The information handling system of claim 1 further comprising:
    an impedance adjustment circuit including a variable capacitor and at least one inductor in parallel; and
    the controller transmitting a signal to adjust the variable capacitor to adjust the first impedance of the digital display connector.

7. The information handling system of claim 1 further comprising:
    a directional coupler for measuring trace first impedance from the digital display connector.

8. A computerized method of impedance mismatch control for a display device connector in an information handling system comprising:
    executing instructions, via a controller, of an impedance mismatch control system for determining impedance differences along an operative connection from the display device connector to a digital display device;
    measuring a first impedance from a point further along the operative connection between the display device connector and the digital display device operatively connected to the information handling system to detect impedance level of a currently-connected display control board and display cable or display trace;
    measuring a second impedance of the display device connector device of the information handling system to detect impedance level of a motherboard and the display device connector;
    determining an impedance mismatch between the first impedance and the second impedance; and
    in response to determining the impedance mismatch, sending an adjustment signal to an impedance adjustment circuit to adjust the second impedance of the display device connector device.

9. The computerized method of claim 8 further comprising:
    sending the adjustment signal to adjust capacitance of a variable capacitor of the impedance adjustment circuit when the impedance mismatch is determined by the impedance mismatch control system.

10. The computerized method of claim 8 further comprising:
    sending the adjustment signal to decrease capacitance at a variable capacitor when the measured impedance of the display device connector is greater than an impedance mismatch variance threshold level above the second impedance measurement, wherein the variable capacitor is in parallel with an inductor of the impedance adjustment circuit.

11. The computerized method of claim 8 further comprising:
    sending the adjustment signal to increase capacitance at a variable capacitor when the measured second impedance of the display device connector is greater than a impedance mismatch variance threshold level below the first impedance measurement, wherein the variable capacitor is in parallel with an inductor of the impedance adjustment circuit.

12. The computerized method of claim 8 further comprising:
    sending the adjustment signal to increase capacitance at a variable capacitor when the measured second impedance of the display device connector is greater than an impedance mismatch variance threshold level above the first impedance measurement, wherein the variable capacitor is in series with an inductor of the impedance adjustment circuit.

13. The computerized method of claim 8 further comprising:
    sending the adjustment signal to decrease capacitance at a variable capacitor when the measured second impedance of the display device connector is greater than an impedance mismatch variance threshold level below the first impedance measurement, wherein the variable capacitor is in series with an inductor of the impedance adjustment circuit.

14. The computerized method of claim 8 further comprising:
    sending the adjustment signal to adjust inductance of a variable inductor when the impedance mismatch is determined by the impedance mismatch control system.

15. The computerized method of claim 8 wherein the first impedance is measured from a digital display device connector cable operatively connected to the display device connector.

16. An information handling system comprising:
    a display device connector for connecting to a digital display device;
    a controller executing instructions of an impedance mismatch control system for determining impedance differences along an operative connection from the display device connector to the digital display device;
    the controller receiving a first impedance measurement from a digital display device connector cable operatively connected to the display device connector to detect impedance level of the digital display device connector cable and a display device connector second impedance measurement of the display device connector to detect impedance level of a motherboard and the display device connector; and
    the controller executing the impedance mismatch control system to determine an impedance mismatch from a difference between the display device connector second impedance measurement and the first impedance measurement that exceeds an impedance mismatch variance threshold level.

17. The information handling system of claim 16 further comprising:
    an impedance adjustment circuit adjusting the impedance of the display device connector device in response to determining the impedance mismatch.

18. The information handling system of claim 16 wherein the impedance mismatch variance threshold level is +/−5% of the first impedance measurement.

19. The information handling system of claim 16 further comprising:
    the controller sending a signal to increase capacitance at a variable capacitor when the measured second impedance of the display device connector is greater than the impedance mismatch variance threshold level below the first impedance measurement, wherein the variable capacitor is in parallel with an inductor of an impedance adjustment circuit.

20. The information handling system of claim 16 further comprising:

the controller sending a signal to decrease capacitance at a variable capacitor when the measured second impedance of the display device connector is greater than the impedance mismatch variance threshold level above the first impedance measurement, wherein the variable capacitor is in parallel with an inductor of an impedance adjustment circuit.

* * * * *